United States Patent
Hunt et al.

(10) Patent No.: US 9,360,591 B2
(45) Date of Patent: Jun. 7, 2016

(54) MICROSTRUCTURED FILM COMPRISING NANOPARTICLES AND MONOMER COMPRISING ALKYLENE OXIDE REPEAT UNITS

(71) Applicant: 3M INNOVATIVE PROPERTIES COMPANY, St. Paul, MN (US)

(72) Inventors: Bryan V. Hunt, Nowthen, MN (US); Maureen C. Nelson, West St. Paul, MN (US); Eric W. Nelson, Stillwater, MN (US); David B. Olson, Marine on St. Croix, MN (US); Richard J. Pokorny, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/426,440

(22) PCT Filed: Aug. 22, 2013

(86) PCT No.: PCT/US2013/056073
§ 371 (c)(1),
(2) Date: Mar. 6, 2015

(87) PCT Pub. No.: WO2014/046837
PCT Pub. Date: Mar. 27, 2014

(65) Prior Publication Data
US 2015/0241599 A1 Aug. 27, 2015

Related U.S. Application Data

(60) Provisional application No. 61/703,407, filed on Sep. 20, 2012.

(51) Int. Cl.
| | | |
|---|---|---|
| *F21V 5/00* | (2015.01) | |
| *G02B 1/04* | (2006.01) | |
| *C08F 220/10* | (2006.01) | |
| *C08L 33/06* | (2006.01) | |
| *C08J 5/18* | (2006.01) | |
| *F21V 5/02* | (2006.01) | |
| *F21V 13/04* | (2006.01) | |
| *F21V 8/00* | (2006.01) | |

(52) U.S. Cl.
CPC .............. *G02B 1/04* (2013.01); *C08F 220/10* (2013.01); *C08J 5/18* (2013.01); *C08L 33/06* (2013.01); *F21V 5/02* (2013.01); *F21V 13/04* (2013.01); *C08J 2333/08* (2013.01); *G02B 6/0053* (2013.01); *G02B 6/0065* (2013.01)

(58) Field of Classification Search
CPC ...... G02B 1/04; G02B 6/0053; G02B 6/0065; C08J 5/18; C08J 2333/08; F21V 5/02; F21V 13/04
USPC ......... 362/327, 326, 339, 337, 618, 619, 620; 428/1.33, 1.54
See application file for complete search history.

(56) References Cited

U.S. PATENT DOCUMENTS

| | | |
|---|---|---|
| 4,576,850 A | 3/1986 | Martens |
| 5,175,030 A | 12/1992 | Lu |
| 5,183,597 A | 2/1993 | Lu |
| 5,783,120 A | 7/1998 | Ouderkirk |
| 5,825,543 A | 10/1998 | Ouderkirk |
| 5,828,488 A | 10/1998 | Ouderkirk |
| 5,882,774 A | 3/1999 | Jonza |
| 6,111,696 A | 8/2000 | Allen |
| 7,074,463 B2 | 7/2006 | Jones |
| 7,241,437 B2 | 7/2007 | Davidson |
| 7,666,920 B2 | 2/2010 | Tokuda |
| 7,981,986 B2 | 7/2011 | Hunt |
| 8,025,934 B2 | 9/2011 | Jones |
| 8,080,608 B2 | 12/2011 | Hunt |
| 8,282,863 B2 | 10/2012 | Jones |
| 8,840,992 B2 | 9/2014 | Iizuka et al. |
| 2005/0063898 A1 | 3/2005 | Ja Chisholm |

(Continued)

FOREIGN PATENT DOCUMENTS

| | | |
|---|---|---|
| EP | 1757442 | 2/2007 |
| JP | 2001-343507 | 3/2000 |

(Continued)

OTHER PUBLICATIONS

Declaration of Bryan V. Hunt Under 37 C.F.R. 1.132, submitted in U.S. Appl. No. 13/985,058; Jul. 1, 2014; 3 pages.
Bertsch et al., Micro Electro Mechanical Systems 2004, "Ceramic Microcomponents by Microstereolitohgraphy", Swiss Federal Institute of Technology, Lausanne, Jan. 25, 2004, pp. 725-728.
International Search Report PCT/US2013/056073; Apr. 24, 2014; 4 pgs.

*Primary Examiner* — Anh Mai
*Assistant Examiner* — Glenn Zimmerman
(74) *Attorney, Agent, or Firm* — Carolyn A. Fischer

(57) ABSTRACT

Presently described are microstructured films, such as brightness enhancing films, having a microstructured surface. The microstructured surface comprises the reaction product of a polymerizable composition comprising at least 20 wt-% of inorganic nanoparticles and a non-aromatic multi-(meth)acrylate monomer comprising at least three contiguous alkylene oxide repeat units. The multi-(meth)acrylate monomer typically comprises two or three (meth)acrylate groups. The alkylene oxide repeat units have the formula —[O-L]- wherein each L is independently a $C_2$-$C_6$ alkylene. Also described is a polymerizable resin composition comprising at least 20 wt-% of inorganic nanoparticles having a refractive index of at least 1.68 and a non-aromatic multi-(meth)acrylate monomer comprising at least three contiguous alkylene oxide repeat units.

26 Claims, No Drawings

(56) References Cited

U.S. PATENT DOCUMENTS

| | | | |
|---|---|---|---|
| 2005/0200278 A1* | 9/2005 | Jones | G02B 5/045 |
| | | | 313/582 |
| 2005/0202238 A1* | 9/2005 | Kishioka | B32B 7/12 |
| | | | 428/355 AC |
| 2006/0204676 A1* | 9/2006 | Jones | B82Y 30/00 |
| | | | 428/1.1 |
| 2006/0204679 A1* | 9/2006 | Jones | B82Y 20/00 |
| | | | 428/1.3 |
| 2007/0212533 A1 | 9/2007 | Jones | |
| 2008/0221291 A1 | 9/2008 | Invie | |
| 2009/0017256 A1 | 1/2009 | Hunt | |
| 2010/0033826 A1 | 2/2010 | Kolb | |
| 2010/0165638 A1 | 7/2010 | Kim | |
| 2010/0183845 A1 | 7/2010 | Hong | |
| 2011/0008577 A1 | 1/2011 | Miyake et al. | |
| 2011/0117322 A1 | 5/2011 | Hong | |
| 2011/0227008 A1 | 9/2011 | Jones | |
| 2011/0244182 A1 | 10/2011 | Hunt | |
| 2011/0244218 A1 | 10/2011 | Suzuki | |
| 2012/0149800 A1 | 6/2012 | Lewandowski | |
| 2012/0189784 A1 | 7/2012 | Jones et al. | |
| 2013/0285182 A1 | 10/2013 | Saie et al. | |
| 2015/0132583 A1* | 5/2015 | Pokorny | C08F 2/48 |
| | | | 428/422 |

FOREIGN PATENT DOCUMENTS

| | | |
|---|---|---|
| JP | 2001-163937 | 6/2001 |
| JP | 2008-238416 | 10/2008 |
| JP | 2009-126035 | 6/2009 |
| JP | 2010-032719 | 2/2010 |
| JP | 2010-189506 | 9/2010 |
| JP | 2011-221492 | 11/2011 |
| JP | 2012-219205 | 11/2012 |
| JP | 2013-108009 | 6/2013 |
| WO | WO 2008/112452 | 9/2008 |
| WO | WO 2009/085926 | 7/2009 |
| WO | WO 2009/134488 | 11/2009 |
| WO | WO 2010/074862 | 7/2010 |
| WO | WO 2011/056475 | 5/2011 |
| WO | WO 2012/158317 | 11/2012 |
| WO | WO 2014/011731 | 1/2014 |

* cited by examiner

MICROSTRUCTURED FILM COMPRISING NANOPARTICLES AND MONOMER COMPRISING ALKYLENE OXIDE REPEAT UNITS

CROSS REFERENCE TO RELATED APPLICATIONS

This application is a national stage filing under 35 U.S.C. 371 of PCT/US2013/056073, filed Aug. 22, 2013, which claims priority to U.S. Provisional Application No. 61/703,407, filed Sep. 20, 2012, the disclosure of which is incorporated by reference in its entirety herein.

SUMMARY

Presently described are microstructured films, such as brightness enhancing films, having a microstructured surface. The microstructured surface comprises the reaction product of a polymerizable composition comprising at least 20 wt-% of inorganic nanoparticles and a non-aromatic multi-(meth) acrylate monomer comprising at least three contiguous alkylene oxide repeat units. The multi-(meth)acrylate monomer typically comprises two or three (meth)acrylate groups. In some embodiments, the alkylene oxide repeat units have the formula —[O-L]- wherein each L is independently a $C_2$-$C_6$ alkylene.

Also described is a polymerizable resin composition comprising at least 20 wt-% of inorganic nanoparticles having a refractive index of at least 1.68 and a non-aromatic multi-(meth)acrylate monomer comprising at least three contiguous alkylene oxide repeat units.

DETAILED DESCRIPTION OF PREFERRED EMBODIMENTS

As used herein "polymerizable composition" refers to the total composition including the organic component and surface modified inorganic nanoparticles. The "organic component" refers to all of the components of the composition except for the surface modified inorganic nanoparticles. Since the surface treatments are generally adsorbed or otherwise attached to the surface of the inorganic nanoparticles, the surface treatments are not considered a portion of the organic component. The wt-% of surface modified inorganic nanoparticles is greater than the concentration of the inorganic nanoparticles alone. It is typical for the wt-% of surface treatment to be about 20-25% of the weight of the surface modified inorganic nanoparticles.

Brightness enhancing films generally enhance on-axis luminance (referred herein as "brightness") of a lighting device. Brightness enhancing films can be light transmissible microstructured films. The microstructured topography can be a plurality of prisms on the film surface such that the films can be used to redirect light through reflection and refraction. The height of the prisms typically ranges from about 1 to about 75 microns. When used in an optical display such as that found in laptop and notebook computers, cell phones, etc., the microstructured optical film can increase brightness of an optical display by limiting light escaping from the display to within a pair of planes disposed at desired angles from a normal axis running through the optical display. As a result, light that would exit the display outside of the allowable range is reflected back into the display where a portion of it can be "recycled" and returned back to the microstructured film at an angle that allows it to exit from the display. The recycling is useful because it can reduce power consumption needed to provide a display with a desired level of brightness.

As described in U.S. Pat. No. 5,183,597 (Lu) and U.S. Pat. No. 5,175,030 (Lu et al.); incorporated herein by reference, a microstructure-bearing article (e.g. brightness enhancing film) can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base (e.g. substrate) and the master, at least one of which is flexible; and (d) curing the composition. The polymerizable composition is typically energy curable in time scales preferably less than five minutes (e.g. for a brightness enhancing film having a 75 micron thickness). The master can be metallic, such as nickel, nickel-plated copper or brass, or can be a thermoplastic material that is stable under the polymerization conditions, and that preferably has a surface energy that allows clean removal of the polymerized material from the master. One or more the surfaces of the base film can optionally be primed or otherwise be treated to promote adhesion of the optical layer to the base.

The organic component as well as the polymerizable composition is preferably substantially solvent free. "Substantially solvent free" refer to the polymerizable composition having less than 5 wt-%, 4 wt-%, 3 wt-%, 2 wt-%, 1 wt-% and 0.5 wt-% of (e.g. organic) solvent. The concentration of solvent can be determined by known methods, such as gas chromatography. Solvent concentrations of less than 0.5 wt-% are preferred.

The components of the polymerizable composition are preferably chosen such that the polymerizable composition has a low viscosity. As used herein, viscosity is measured (at a shear rate up to 1000 sec−1) with 40 mm parallel plates using a Dynamic Stress Rheometer. The viscosity of the polymerizable composition is less than 1000 cps and typically less than 900 cps. The viscosity of the polymerizable composition may be less than 800 cps, less than 700 cps, less than 600 cps, or less than 500 cps at the coating temperature.

The coating temperature typically ranges from ambient temperature, (i.e. 25° C.) to 180° F. (82° C.). The coating temperature may be less than 170° F. (77° C.), less than 160° F. (71° C.), less than 150° F. (66° C.), less than 140° F. (60° C.), less than 130° F. (54° C.), or less than 120° F. (49° C.). The organic component can be a solid or comprise a solid component provided that the melting point in the polymerizable composition is less than the coating temperature. The organic component can be a liquid at ambient temperature.

The organic component as well as the polymerizable composition has refractive index of at least 1.47, for most product applications; whereas the polymerizable resin composition of a turning film may have a refractive index as low as 1.44. The refractive index of the organic component or the polymerizable composition may be at least 1.48, 1.49, 1.50, 1.51, 1.52, 1.53, 1.54, 1.55, 1.56, 1.57, 1.58, 1.59, 1.60, or 1.61. The polymerizable composition including the nanoparticles can have a refractive index as high as 1.70. (e.g. at least 1.61, 1.62, 1.63, 1.64, 1.65, 1.66, 1.67, 1.68, or 1.69) High transmittance in the visible light spectrum is also typically preferred.

The polymerizable composition comprises at least one non-aromatic multi-(meth)acrylate monomer comprising alkylene oxide repeat units. The alkylene repeat unit typically has the formula —[O-L]- wherein L is a linear or branched alkylene. In some embodiments, the alkylene oxide is a linear or branched $C_2$-$C_6$ alkylene. The non-aromatic multi-(meth) acrylate monomer typically comprises two or three (meth) acrylate groups.

The non-aromatic multi-(meth)acrylate monomer generally comprises at least three or four contiguous alkylene oxide repeat units. In some embodiments, the di or tri(meth)acrylate monomer comprises at least 5, 6, 7, 8, 9, or 10 contiguous alkylene oxide repeat units. In some embodiments, the number of contiguous alkylene oxide repeat units is no greater than 30, or 25, or 20, or 15.

In some embodiments, the non-aromatic multi-(meth) acrylate monomer may be represented by the general formula:

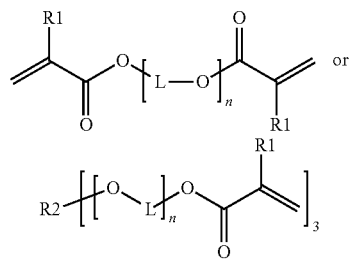

wherein R1 is H or methyl, R2 is a trivalent organic residue, L is independently a straight-chain or branched $C_2$ to $C_6$ alkylene, and n is 3 to 30.

In some embodiments, R2 is a hydrocarbon residue comprising at least 3, 4, 5, or 6 carbon atoms and typically no greater than 12 carbon atoms. In some embodiments, R is a hydrocarbon residue, optionally further comprising one or more oxygen, sulfur or nitrogen atoms.

The non-aromatic multi-(meth)acrylate monomer comprising at least three or four contiguous alkylene oxide repeat units may comprise any combination of linear and/or branched alkylene oxide repeat units. In some embodiments, the monomer comprises solely ethylene oxide repeat units. In other embodiments, the monomer comprises solely propylene oxide repeat units. In yet other embodiments, the monomer comprises solely butylene oxide repeat units. In yet other embodiments, the monomer may comprise various combinations of such alkylene oxide repeat units. For example, the non-aromatic multi-(meth)acrylate monomer may comprise a combination of both ethylene oxide and propylene oxide repeat units.

Various non-aromatic multi-(meth)acrylate monomers comprising at least three contiguous $C_2$-$C_4$ alkylene oxide repeat units are commercially available. Other monomers can be synthesized, such as by reaction of polyalkylene oxide polyols with acrylic acid, such as described in U.S. Provisional Application No. 61/671,354, filed Jul. 13, 2012; incorporated herein by reference.

In some embodiments, a di(meth)acrylate monomer is utilized comprising 3 or 4 contiguous alkylene oxide repeat units, such as ethylene oxide repeat units, propylene oxide repeat units, or a mixture thereof. The number of contiguous alkylene oxide repeat units may be no greater than 13, or 12, or 11, or 10, or 9, or 8, and in some embodiments, no greater than 7, or 6, or 5. Representative monomers, available from Sartomer USA (Exton, Pa.) include tetraethylene glycol diacrylate and polyethylene glycol diacrylates, such as available under the trade designations "SR268, "SR259", "SR344" and "SR610".

Other representative monomers include polypropylene glycol diacrylates available from Monomer-Polymer & Dajac Labs, PA, USA under the trade designation "Polypropylene Glycol 400 diacrylate".

Polyethylene and polypropylene glycol diacrylates typically comprise a mixture of molecules wherein n averages the range specified above.

In other embodiments, a tri(meth)acrylate monomer is utilized comprising 4 to 5 contiguous alkylene oxide repeat units, such as ethylene oxide repeat units, propylene oxide repeat units, or a mixture thereof. The number of contiguous alkylene oxide repeat units may be no greater than 15, or 14, or 13, and in some embodiments, no greater than 12, or 9, or 10. A representative monomer includes ethoxylated trimethylol propane tri(meth)acrylate monomers, the acrylate having the following formula:

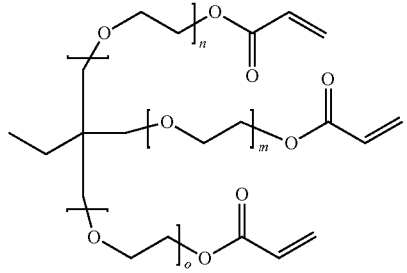

wherein at least one of n, m or o is 3 or 4. The sum of n+m+o is typically at least 5, 6, 7, 8, 9, or 10 and in some embodiments no greater than 30.

One representative monomer of such formula, wherein the sum of n, m and o is about 15, is available from Sartomer under the trade designation "SR9035".

The inclusion of the non-aromatic multi-(meth)acrylate monomer(s) comprising alkylene oxide repeat units can reduce the damage contrast from impact, as measured according to the Ball Drop Test, as described in the forthcoming examples. Damage contrast is a measurement used herein to assess the impact resistance of a microstructured brightness enhancement film. The damage contrast can be determined by measuring the difference between the brightness of the impacted area and unimpacted area divided by the brightness of the unimpacted area. When the damage contrast is zero the damage from the impact of the dropping ball is not measureable. When the damage contrast is 0.50, the area impacted by the ball is 50% brighter than the unimpacted area at the measurement observation angle. The greater the contrast, the more visible the damaged area is and vice-versa. For microstructured (e.g. brightness enhancing) films wherein the microstructured surface comprises the reaction product of the compositions described herein, damage contrast is typically no greater than 0.35 or 0.30. In favored embodiments, the damage contrast is no greater than 0.25, 0.20, or 0.15. In more favored embodiments, the damage contrast is no greater than 0.14, or 0.12, or 0.10. In even more favored embodiments, the damage contrast is no greater than 0.09, or 0.08, or 0.07, or 0.06, or 0.05. As exemplified in the forthcoming examples, by use of the polymerizable compositions described herein, the impact resistance as measured by damage contrast can be reduced to 0.05, 0.03, 0.02, 0.01 and even 0. It is appreciated that other properties (than damage contrast) can be measured for other types of microstructured films.

The concentration of the non-aromatic multi-(meth)acrylate monomer comprising alkylene oxide repeat units in the polymerizable composition is typically at least 3 wt-%, 4 wt-% or 5 wt-%. In some embodiments, the organic component is comprised solely of one or more of such non-aromatic multi-(meth)acrylate monomers. Thus, 100% of the organic component is non-aromatic multi-(meth)acrylate monomer(s) comprising at least three contiguous alkylene oxide repeat units. Since the composition also comprises at least about 20 wt-% inorganic nanoparticle and at least about 5 wt-% surface treatment, the polymerizable composition typically comprises a maximum of about 75 wt-% of the non-aromatic multi-(meth)acrylate monomer(s) comprising at least three contiguous alkylene oxide repeat units In yet other embodiments, the non-aromatic multi-(meth) acrylate monomer comprising alkylene oxide repeat units is combined with other (i.e. different) monomers, such as crosslinking agents and/or monofunctional diluents. In such embodiments, the polymerizable composition may comprise at least 6 wt-%, 7 wt-%, 8 wt-%, 9 wt-%, or 10 wt-% of the non-aromatic multi-(meth)acrylate monomer(s) comprising alkylene oxide repeat units and typically no greater than 50 wt-% or 45 wt-%. In some embodiments, the polymerizable composition comprises no greater than 40 wt-%, 39 wt-%, 38 wt-%, 37 wt-%, 36 wt-%, or 35 wt-% of the non-aromatic multi-(meth)acrylate monomer(s) comprising alkylene oxide repeat units.

In some embodiments, the organic component is free of crosslinker. In such embodiment, the polymerizable composition comprises the non-aromatic multi-(meth)acrylate monomer comprising alkylene oxide repeat units alone or in combination with mono(meth)acrylate diluent(s).

In other embodiments, the organic component is free of mono(meth)acrylate diluents. In such embodiment, the polymerizable composition comprises the non-aromatic multi-(meth)acrylate monomer comprising alkylene oxide repeat units alone or in combination with crosslinker.

In yet other embodiments, the organic component comprises at least one non-aromatic multi-(meth)acrylate monomer comprising alkylene oxide repeat units, one or more mono(meth)acrylate diluent(s), and one or more crosslinker(s).

In some embodiments, the polymerizable composition further comprises a mono(meth)acrylate diluent. Diluents typically have a refractive index greater than 1.50 (e.g. at least 1.51 or 1.52). Such reactive diluents can be halogenated or non-halogenated (e.g. non-brominated). In some embodiments, the mono(meth)acrylate diluent has a refractive index of at least 1.53, 1.54, 1.55, 1.56, 1.57, or 1.58 and typically no greater than 1.60.

In some embodiments, the mono(meth)acrylate diluents(s) have a viscosity of less than 150 cps, 100 cps, 80 cps, 60 cps, 40 cps, or 20 cps at 25° C. A sufficient concentration of low viscosity diluents can reduce the viscosity of the organic component which is amenable to increasing the concentration of inorganic nanoparticles.

When present, the polymerizable composition may comprise at least 5 wt-%, 10 wt-%, or 15 wt-% of mono(meth) acrylate diluent(s) and typically no greater than 60 wt-% or 55 wt-%. In some embodiments, the polymerizable composition may comprise at least 16 wt-%, 17 wt-%, 18 wt-%, 19 wt-%, or 20 wt-% of mono(meth)acrylate diluent(s). In other embodiments, the polymerizable composition may comprise at least 21 wt-%, 22 wt-%, 23 wt-%, 24 wt-%, or 25 wt-% of mono(meth)acrylate diluent(s). In yet other embodiments, the polymerizable composition may comprise greater than 25 wt-%, such as at least 30 wt-%, 35 wt-%, 40 wt-%, 45 wt-%, or 50 wt-% of mono(meth)acrylate diluent(s).

Suitable mono(meth)acrylate diluents include for example phenoxy ethyl(meth)acrylate; phenoxy-2-methylethyl(meth) acrylate; phenoxyethoxyethyl(meth)acrylate, 3-hydroxy-2-hydroxypropyl(meth)acrylate; benzyl(meth)acrylate; phenylthio ethyl acrylate; 2-naphthylthio ethyl acrylate; 1-naphthylthio ethyl acrylate; 2,4,6-tribromophenoxy ethyl acrylate; 2,4-dibromophenoxy ethyl acrylate; 2-bromophenoxy ethyl acrylate; 1-naphthyloxy ethyl acrylate; 2-naphthyloxy ethyl acrylate; phenoxy 2-methylethyl acrylate; phenoxyethoxyethyl acrylate; 3-phenoxy-2-hydroxy propyl acrylate; 2,4-dibromo-6-sec-butylphenyl acrylate; 2,4-dibromo-6-isopropylphenyl acrylate; benzyl acrylate; phenyl acrylate; 2,4,6-tribromophenyl acrylate. Other high refractive index monomers such as pentabromobenzyl acrylate and pentabromophenyl acrylate can also be employed.

In some embodiments, the organic comprises a biphenyl monomer, a benzyl monomer, or a combination thereof as a mono(meth)acrylate diluent.

Monofunctional biphenyl monomers comprise a terminal biphenyl group (wherein the two phenyl groups are not fused, but joined by a bond) or a terminal group comprising two aromatic groups joined by a linking group. The monofunctional biphenyl monomer(s) also comprise a single ethylenically unsaturated group that is preferably polymerizable by exposure to (e.g. UV) radiation. The monofunctional biphenyl monomer(s) preferably comprise a single (meth)acrylate group or single thio(meth)acrylate group. Acrylate functionality is typically preferred.

The polymerizable composition may include a single biphenyl(meth)acrylate monomer or a combination of two or more biphenyl(meth)acrylate monomers.

In one embodiment, the polymerizable composition comprises a biphenyl(meth)acrylate monomer having the general formula:

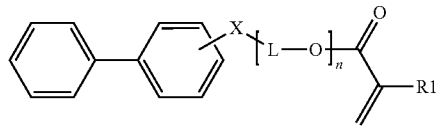

wherein R1 is H or CH$_3$;

X is O or S;

n ranges from 0 to 10 (e.g. n is 1, 2, 3, 4, 5, 6, 7, 8, 9, or 10); and

L is an alkylene group having 1 to 5 carbon atoms (i.e. methylene, ethylene, propylene, butylene, or pentylene), optionally substituted with hydroxy.

In another embodiment, the polymerizable composition comprises a biphenyl(meth)acrylate monomer having the general formula:

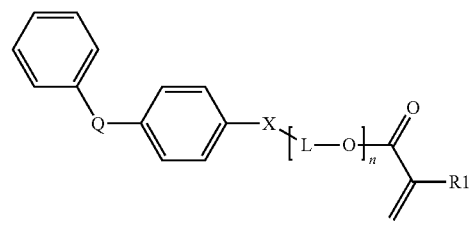

wherein R1 is H or CH$_3$;

X is O or S;

Q is selected from —(C(CH$_3$)$_2$—, —CH$_2$, —C(O)—, —S(O)—, and —S(O)$_2$—;

n ranges from 0 to 10 (e.g. n is 1, 2, 3, 4, 5, 6, 7, 8, 9, or 10); and

L is an alkylene group having 1 to 5 carbon atoms, optionally substituted with hydroxy.

One representative biphenyl(meth)acrylate monomer, 2-phenyl-phenyl acrylate, commercially available from Toagosei Co. Ltd. of Japan under the trade designation "TO-2344" is depicted as follows:

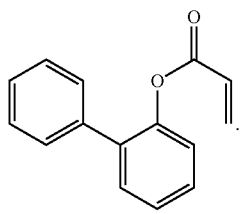 [SMILES: C=CC(=O)Oc1ccccc1-c1ccccc1]

Another biphenyl(meth)acrylate monomer is 4-(-2-phenyl-2-propyl)phenyl acrylate, available from Toagosei Co. Ltd. under the trade designation "TO-2345". Yet another biphenyl(meth)acrylate monomer, 2-phenyl-2-phenoxyethyl acrylate, available from Toagosei Co. Ltd. under the trade designation "TO-1463" and under the trade designation "M1142" from Miwon Specialty Chemical Co. Ltd., Korea, is depicted as follows:

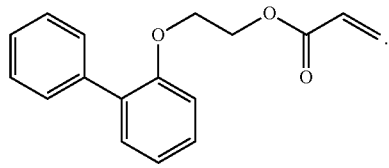 [SMILES: C=CC(=O)OCCOc1ccccc1-c1ccccc1]

In another embodiment, the polymerizable composition comprises a benzyl(meth)acrylate monomer as a mono(meth)acrylate diluent. Suitable benzyl(meth)acrylate monomers are described in PCT Publication No. WO2012/158317; incorporated herein by reference. The benzyl(meth)acrylate monomer typically has the general formula:

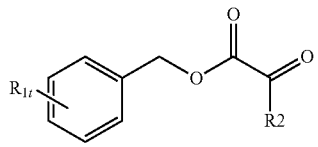

wherein at least one R1 comprises an aromatic substituent,
t is an integer from 1 to 4; and
R2 is hydrogen or methyl.

R1 may comprise various aromatic substituents such as

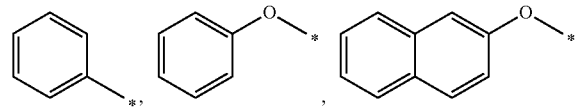

-continued

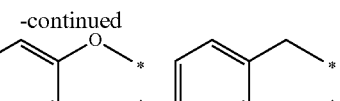

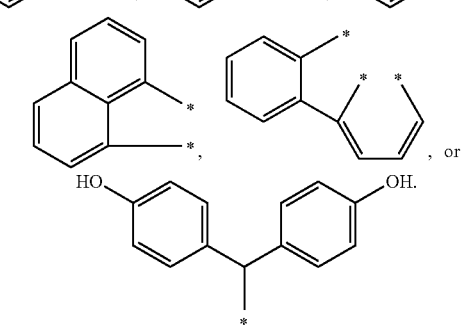

The aromatic substituent R1 is generally bonded to the aromatic ring of the benzyl group by at least one divalent (e.g. alkylene or ether) linking group. Hence, the aromatic ring of R1 is typically not fused to the aromatic benzyl ring, as in the case of naphthyl. In some embodiments, the aromatic substituent R1 is bonded to the aromatic benzyl ring by two or more divalent (e.g. alkylene or ether) linking groups.

In some favored embodiments, t is 1. Representative structures include

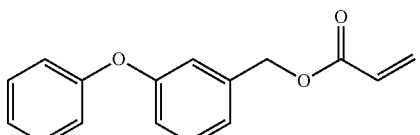

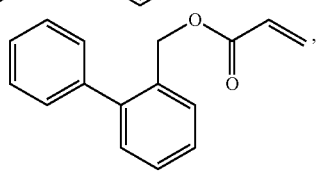

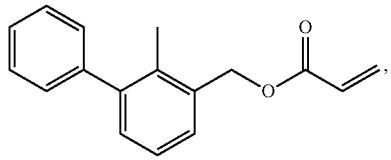

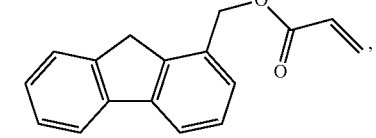

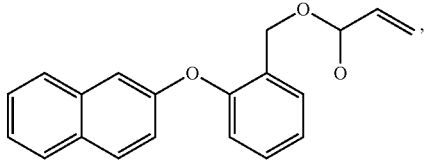

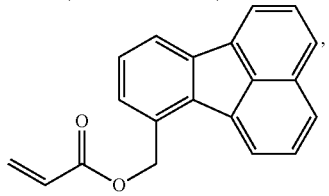

-continued

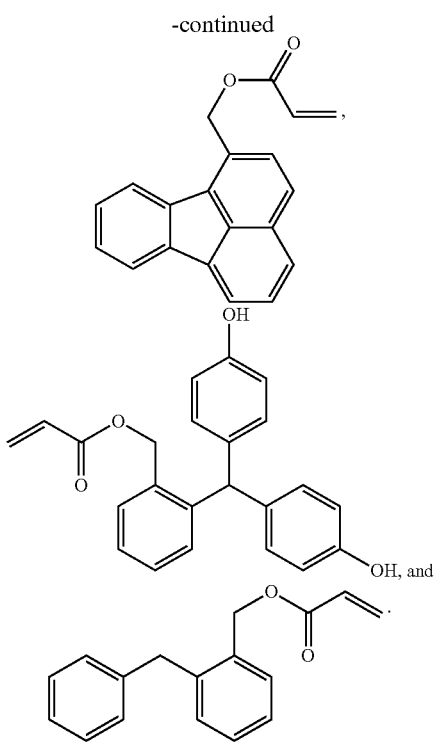

In other embodiments, t is greater than 1. For example, in one embodiment, t is 3. One representative structure is

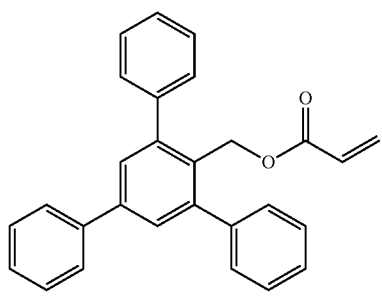 [SMILES: C=CC(=O)OCc1c(-c2ccccc2)cc(-c2ccccc2)cc1-c1ccccc1]

In some embodiments, the polymerizable composition comprises a crosslinker that comprises at least three (meth) acrylate groups.

Suitable crosslinking agents include for example pentaerythritol tri(meth)acrylate, pentaerythritol tetra(meth) acrylate, trimethylolpropane tri(methacrylate), dipentaerythritol penta(meth)acrylate, dipentaerythritol hexa(meth) acrylate, trimethylolpropane ethoxylate tri(meth)acrylate, glyceryl tri(meth)acrylate, pentaerythritol propoxylate tri (meth)acrylate, and ditrimethylolpropane tetra(meth)acrylate. Any one or combination of crosslinking agents may be employed. Since methacrylate groups tend to be less reactive than acrylate groups, the crosslinker(s) are preferably free of methacrylate functionality.

The crosslinker is distinguished from the non-aromatic multi-(meth)acrylate monomer comprising alkylene oxide repeat units by either being free of alkylene oxide repeat units or by comprising less than three contiguous alkylene oxide repeat units.

When the crosslinker comprises alkylene oxide repeat, such as ethylene oxide repeat units, the crosslinker is distinguished from the non-aromatic multi-(meth)acrylate monomer comprising alkylene oxide repeat units in that the crosslinker has a molecular weight per (meth)acrylate group of no greater than 150 g/mole; whereas the non-aromatic multi-(meth)acrylate monomer comprising alkylene oxide repeat units has a molecular weight per (meth)acrylate group of at least 200, 250, or 300 g/mole.

Various crosslinkers are commercially available. For example, pentaerythritol triacrylate (PETA) is commercially available from Sartomer Company, under the trade designation "SR444", from Osaka Organic Chemical Industry, Ltd. Osaka, Japan under the trade designation "Viscoat #300", from Toagosei Co. Ltd., Tokyo, Japan under the trade designation "Aronix M-305", and from Eternal Chemical Co., Ltd., Kaohsiung, Taiwan under the trade designation "Etermer 235". Trimethylol propane triacrylate (TMPTA), depicted as follows, is commercially available from Sartomer Company under the trade designations "SR351" and from Toagosei Co. Ltd. under the trade designation "Aronix M-309".

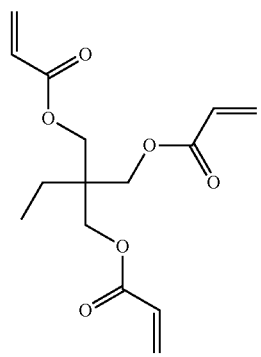 [SMILES: C=CC(=O)OCC(CC)(COC(=O)C=C)COC(=O)C=C]

Ethoxylated trimethylolpropane triacrylate and ethoxylated pentaerythritol tetraacrylate crosslinkers are commercially available from Sartomer under the trade designations "SR454" and "SR494" respectively. SR454 is depicted as follows:

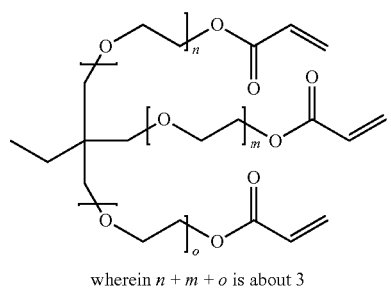

wherein $n + m + o$ is about 3

In some embodiments, it is preferred that the polymerizable composition is substantially free (i.e. contain less than 1 wt-%) of bromine. In other embodiments, the total amount of bromine in combination with chlorine is less than 1 wt-%. In some aspects, the polymerizable composition is substantially non-halogenated (i.e. contains less than 1 wt-% total of bromine, chlorine, fluorine and iodine). The polymerizable resin for forming the microstructured surface further comprises inorganic nanoparticles.

The total amount of inorganic nanoparticles present in the polymerizable resin or optical article is at least 20 wt-%, 25 wt-%, 30 wt-% 35 wt-% or 40 wt-%. The concentration is typically less than 70 wt-%, and more typically less than 60 wt-% in order that the polymerizable resin composition has a suitable viscosity for use in cast and cure processes of making microstructured films. In some embodiments, the concentrations just described are the concentration of high refractive index nanoparticles. In other embodiments, the concentrations just described are the concentration of a combination of higher refractive index nanoparticles and lower refractive index nanoparticles, such as silica.

The size of such particles is chosen to avoid significant visible light scattering. It may be desirable to employ a mixture of inorganic oxide particle types to optimize an optical or material property and to lower total composition cost. The surface modified colloidal nanoparticles can be oxide particles having a (e.g. unassociated) primary particle size or associated particle size of greater than 1 nm, 5 nm or 10 nm. The primary or associated particle size is generally and less than 100 nm, 75 nm, or 50 nm. Typically the primary or associated particle size is less than 40 nm, 30 nm, or 20 nm. It is preferred that the nanoparticles are unassociated. Their measurements can be based on transmission electron miscroscopy (TEM).

The high refractive index nanoparticles typically have a refractive index of at least 1.68. Such nanoparticles typically comprise or consist of metal oxides such as, for example, alumina, zirconia, titania, mixtures thereof, or mixed oxides thereof.

Zirconia and titania nanoparticles can have a particle size from 5 to 50 nm, or 5 to 15 nm, or 8 nm to 12 nm. Zirconia nanoparticles can be present in the durable article or optical element in an amount from 10 to 70 wt-%, or 30 to 60 wt-%. Zirconias for use in composition and articles of the invention are available from Nalco Chemical Co. under the trade designation "Nalco OOSSOO8" and from Buhler AG Uzwil, Switzerland under the trade designation "Buhler zirconia Z-WO sol".

The zirconia particles can be prepared using hydrothermal technology as described in PCT Publication WO2009/085926 and U.S. Pat. No. 7,241,437; incorporated herein by reference. Once formed, the nanoparticles typically comprise adsorbed volatile acid (i.e. monocarboxylic acids having six or less carbon atoms) such as acetic acid.

The inorganic nanoparticles are generally surface modified. Surface modification involves attaching surface modification agents to inorganic oxide (e.g. zirconia) particles to modify the surface characteristics. The overall objective of the surface modification of the inorganic particles is to provide resins with homogeneous components and preferably a low viscosity that can be prepared into films (e.g. using cast and cure processes) with high brightness.

The nanoparticles are often surface modified to improve compatibility with the organic component. The surface modified nanoparticles are often non-associated, non-agglomerated, or a combination thereof in the organic component. The resulting light management films that contain these surface modified nanoparticles tend to have high optical clarity and low haze. The addition of the high refractive index surface modified nanoparticles, such as zirconia, can increase the gain of brightness enhancement film compared to films that contain only polymerized organic material.

The monocarboxylic acid (i.e., containing one carboxylic acid group per molecule) surface treatments may be represented by the formula A-B where the A group is a monocarboxylic acid group capable of attaching to the surface of a (e.g. zirconia or titania) nanoparticle, and B is a compatibilizing group that comprises a variety of different functionalities. The carboxylic acid group can be attached to the surface by adsorption and/or formation of an ionic bond. The compatibilizing group B is generally chosen such that it is compatible with the polymerizable resin of the (e.g. brightness enhancing) microstructured optical article. The compatibilizing group B can be reactive or nonreactive and can be polar or non-polar.

The compatibilizing group B is preferably reactive such that it can copolymerize with the organic component of the (e.g. brightness enhancing) microstructured optical article. For example, free radically polymerizable groups such as (meth)acrylate compatibilizing groups can copolymerize with (meth)acrylate functional organic monomers to generate brightness enhancement articles with good homogeneity.

Surface modified nanoparticles can be substantially fully condensed. Fully condensed nanoparticles (with the exception of silica) typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

In some embodiments, as described in U.S. Patent Application Publication No. 2011/0227008, incorporated herein by reference, (e.g. zirconia) inorganic nanoparticles described are surface modified with a surface treatment comprising a compound comprising a carboxylic acid end group and a $C_3$-$C_{16}$ ester units such as $C_3$-$C_8$ ester repeat units or at least one $C_6$-$C_{16}$ ester unit. Employing even a small concentration of a compound having a higher molecular weight ester unit can improve the optical clarity of the polymerizable resin. The compound typically has the general formula:

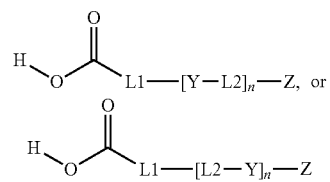

wherein n averages from 1.1 to 6;

L1 is a $C_1$-$C_8$ alkylene, arylalkylene, or arylene group, optionally substituted with one or more oxygen atoms or an ester group;

L2 is a $C_3$-$C_8$ alkylene, arylalkylene, or arylene group, optionally substituted with one or more oxygen atoms;

Y is

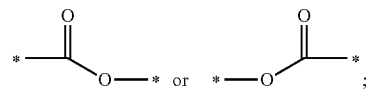

and

Z is an end group comprising a $C_2$-$C_8$ alkyl, ether, ester, alkylene oxide, (meth)acrylate, or a combination thereof.

In some embodiments, L2 comprises a C6-C8 alkylene group and n averages 1.5 to 2.5. Z preferably comprises a $C_2$-$C_8$ alkylene group. Z preferably comprises a (meth)acrylate end group.

Surface modifiers comprising a carboxylic acid end group and a $C_3$-$C_{16}$ ester repeat unit can be derived from reacting a hydroxy polycaprolactone such as a hydroxy polycaprolactone(meth)acrylate with an aliphatic or aromatic anhydride. The hydroxy polycaprolactone compounds are typically available as a polymerized mixture having a distribution of molecules. At least a portion of the molecules have a $C_3$-$C_8$ ester repeat unit, i.e. n is at least 2. However, since the mixture also comprises molecules wherein n is 1, the average n for the hydroxy polycaprolactone compound mixture may be 1.1, 1.2, 1.3, 1.4, or 1.5. In some embodiments, n averages 2.0, 2.1, 2.2, 2.3, 2.4 or 2.5.

Suitable hydroxy polycaprolactone(meth)acrylate compounds are commercially available from Cognis under the trade designation "Pemcure 12A" and from Sartomer under the trade designation "SR495" (reported to have a molecular weight of 344 g/mole).

Suitable aliphatic anhydrides include for example maleic anhydride, succinic anhydride, suberic anhydride, and glutaric anhydride. In some embodiments, the aliphatic anhydride is preferably succinic anhydride.

Aromatic anhydrides have a relatively higher refractive index (e.g. RI of at least 1.50). The inclusion of surface treatment compounds such as those derived from aromatic anhydrides can raise the refractive index of the overall polymerizable resin composition. Suitable aromatic anhydrides include for example phthalic anhydride.

The surface modification of the particles in the colloidal dispersion can be accomplished in a variety of ways. The process generally involves the mixture of an inorganic particle dispersion with surface modifying agents. Optionally, a co-solvent can be added, such as for example, 1-methoxy-2-propanol, ethanol, isopropanol, ethylene glycol, N,N-dimethylacetamide and 1-methyl-2-pyrrolidinone. The co-solvent can enhance the solubility of the surface modifying agents as well as the surface modified particles. The mixture comprising the inorganic sol and surface modifying agents is subsequently reacted at room or an elevated temperature, with or without mixing.

The surface modified particles can then be incorporated into the curable (i.e. polymerizable) resin compositions in various methods. In a preferred aspect, a solvent exchange procedure is utilized whereby the resin is added to the surface modified sol, followed by removal of the water and co-solvent (if used) via evaporation, thus leaving the particles dispersed in the polymerizable resin. The evaporation step can be accomplished for example, via distillation, rotary evaporation or oven drying. In another aspect, the surface modified particles can be extracted into a water immiscible solvent followed by solvent exchange, if so desired. Alternatively, another method for incorporating the surface modified nanoparticles in the polymerizable resin involves the drying of the modified particles into a powder, followed by the addition of the resin material into which the particles are dispersed. The drying step in this method can be accomplished by conventional means suitable for the system, such as, for example, oven drying or spray drying.

The inclusion of the surface modified nanoparticles can raise the Tg of the polymerizable resin composition. Thus, the organic component can have a lower Tg than the (i.e. nanoparticle-containing) polymerizable resin composition. The glass transition temperature can be measured by methods known in the art, such as Differential Scanning Calorimetry (DSC), modulated DSC, or Dynamic Mechanical Analysis. The polymerizable composition can be polymerized by conventional free radical polymerization methods.

The UV curable polymerizable compositions comprise at least one photoinitiator. A single photoinitiator or blends thereof may be employed in the brightness enhancement film of the invention. In general the photoinitiator(s) are at least partially soluble (e.g. at the processing temperature of the resin) and substantially colorless after being polymerized. The photoinitiator may be (e.g. yellow) colored, provided that the photoinitiator is rendered substantially colorless after exposure to the UV light source.

Suitable photoinitiators include monoacylphosphine oxide and bisacylphosphine oxide. Commercially available mono or bisacylphosphine oxide photoinitiators include 2,4,6-trimethylbenzoybiphenylphosphine oxide, commercially available from BASF (Charlotte, N.C.) under the trade designation "Lucirin TPO"; ethyl-2,4,6-trimethylbenzoylphenyl phosphinate, also commercially available from BASF under the trade designation "Lucirin TPO-L"; and bis(2,4,6-trimethylbenzoyl)-phenylphosphine oxide commercially available from Ciba Specialty Chemicals under the trade designation "Irgacure 819". Other suitable photoinitiators include 2-hydroxy-2-methyl-1-phenyl-propan-1-one, commercially available from Ciba Specialty Chemicals under the trade designation "Darocur 1173" as well as other photoinitiators commercially available from Ciba Specialty Chemicals under the trade designations "Darocur 4265", "Irgacure 651", "Irgacure 1800", "Irgacure 369", "Irgacure 1700", and "Irgacure 907".

The photoinitiator can be used at a concentration of about 0.1 to about 10 weight percent. More preferably, the photoinitiator is used at a concentration of about 0.5 to about 5 wt-%. Greater than 5 wt-% is generally disadvantageous in view of the tendency to cause yellow discoloration of the brightness enhancing film. Other photoinitiators and photoinitiator may also suitably be employed as may be determined by one of ordinary skill in the art.

Surfactants such as fluorosurfactants and silicone based surfactants can optionally be included in the polymerizable composition to reduce surface tension, improve wetting, allow smoother coating and fewer defects of the coating, etc.

The optical layer can directly contact the base layer or be optically aligned to the base layer, and can be of a size, shape and thickness allowing the optical layer to direct or concentrate the flow of light. The optical layer can have a structured or micro-structured surface that can have any of a number of useful patterns such as described and shown in U.S. Pat. No. 7,074,463. The micro-structured surface can be a plurality of parallel longitudinal ridges extending along a length or width of the film. These ridges can be formed from a plurality of prism apexes. These apexes can be sharp, rounded or flattened or truncated. For example, the ridges can be rounded to a radius in a range of 4 to 7 to 15 micrometers.

These include regular or irregular prismatic patterns can be an annular prismatic pattern, a cube-corner pattern or any other lenticular microstructure. A useful microstructure is a regular prismatic pattern that can act as a totally internal reflecting film for use as a brightness enhancement film. Another useful microstructure is a corner-cube prismatic pattern that can act as a retro-reflecting film or element for use as reflecting film. Another useful microstructure is a prismatic pattern that can act as an optical element for use in an optical display. Another useful microstructure is a prismatic pattern that can act as an optical turning film or element for use in an optical display.

The base layer can be of a nature and composition suitable for use in an optical product, i.e. a product designed to control the flow of light. Almost any material can be used as a base material as long as the material is sufficiently optically clear and is structurally strong enough to be assembled into or used within a particular optical product. A base material can be chosen that has sufficient resistance to temperature and aging that performance of the optical product is not compromised over time.

The particular chemical composition and thickness of the base material for any optical product can depend on the requirements of the particular optical product that is being constructed. That is, balancing the needs for strength, clarity, temperature resistance, surface energy, adherence to the optical layer, among others.

Useful base materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polycyclo-olefins, polyimides, and glass. Optionally, the base material can contain mixtures or combinations of these materials. In an embodiment, the base may be multi-layered or may contain a dispersed component suspended or dispersed in a continuous phase.

For some (e.g. brightness enhancing) optical products preferred base materials include polyethylene terephthalate (PET) and polycarbonate. Examples of useful PET films include photograde polyethylene terephthalate and MELINEX™ PET available from DuPont Films of Wilmington, Del.

Some base materials can be optically active, and can act as polarizing materials. A number of bases, also referred to herein as films or substrates, are known in the optical product art to be useful as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microfine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. Nos. 5,825,543 and 5,783,120. The use of these polarizer films in combination with a brightness enhancement film has been described in U.S. Pat. No. 6,111,696.

A second example of a polarizing film that can be used as a base are those films described in U.S. Pat. No. 5,882,774. Films available commercially are the multilayer films sold under the trade designation DBEF (Dual Brightness Enhancement Film) from 3M. The use of such multilayer polarizing optical film in a brightness enhancement film has been described in U.S. Pat. No. 5,828,488.

For the following defined terms, these definitions shall be applied, unless a different definition is given in the claims or elsewhere in this specification.

"Microstructure" is used herein as defined and explained in U.S. Pat. No. 4,576,850. Thus, it means the configuration of a surface that depicts or characterizes the predetermined desired utilitarian purpose or function of the article having the microstructure. Discontinuities such as projections and indentations in the surface of said article will deviate in profile from the average center line drawn through the microstructure such that the sum of the areas embraced by the surface profile above the center line is equal to the sum of the areas below the line, said line being essentially parallel to the nominal surface (bearing the microstructure) of the article. The heights of said deviations will typically be about +/−0.005 to +/−750 microns, as measured by an optical or electron microscope, through a representative characteristic length of the surface, e.g., 1-30 cm. Said average center line can be piano, concave, convex, aspheric or combinations thereof. Articles where said deviations are of low order, e.g., from +/−0.005+/−0.1 or, preferably, +/−0.05 microns, and said deviations are of infrequent or minimal occurrence, i.e., the surface is free of any significant discontinuities, are those where the microstructure-bearing surface is an essentially "flat" or "smooth" surface, such articles being useful, for example, as precision optical elements or elements with a precision optical interface, such as ophthalmic lenses. Articles where said deviations are of low order and of frequent occurrence include those having anti-reflective microstructure. Articles where said deviations are of high-order, e.g., from +/−0.1 to +/−750 microns, and attributable to microstructure comprising a plurality of utilitarian discontinuities which are the same or different and spaced apart or contiguous in a random or ordered manner, are articles such as retroreflective prismatic sheeting, microstructured molds (e.g. for molding paste to prepare barrier ribs), linear Fresnel lenses, video discs, light-collimating privacy films, and brightness enhancing films. The microstructure-bearing surface can contain utilitarian discontinuities of both said low and high orders. The microstructure-bearing surface may contain extraneous or non-utilitarian discontinuities so long as the amounts or types thereof do not significantly interfere with or adversely affect the predetermined desired utilities of said articles.

"Index of refraction," or "refractive index," refers to the absolute refractive index of a material (e.g., a monomer) that is understood to be the ratio of the speed of electromagnetic radiation in free space to the speed of the radiation in that material. The refractive index can be measured using known methods and is generally measured using a Bausch and Lomb Refractometer (CAT No. 33.46.10). It is generally appreciated that the measured index of refraction can vary to some extent depending on the instrument.

"(Meth)acrylate" refers to both acrylate and methacrylate compounds.

The term "nanoparticles" is defined herein to mean particles (primary particles or associated primary particles) with a diameter less than about 100 nm.

"Surface modified nanoparticle" refers to nanoparticles each with a modified surface such that the nanoparticles provide a stable dispersion.

"Stable dispersion" is defined herein as a dispersion in which the nanoparticles do not agglomerate after standing for a period of time, such as about 24 hours, under ambient conditions—e.g. room temperature (about 20-22° C.), atmospheric pressure, and no extreme electromagnetic forces.

"Primary particle size" refers to the mean diameter of a single (non-aggregate, non-agglomerate) particle.

"Aggregate" refers to a strong association between primary particles that may be chemically bound to one another. The breakdown of aggregates into smaller particles is difficult to achieve.

"Agglomerate refers to a weak association between primary particles that may be held together by charge or polarity and can be broken down into smaller entities.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Unless otherwise indicated, all numbers expressing quantities of ingredients, measurement of properties and so forth used in the specification and claims are to be understood as being modified in all instances by the term "about."

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

EXAMPLES

All parts, percentages, ratios, etc. in the examples are by weight, unless noted otherwise. Solvents and other reagents used were obtained from Sigma-Aldrich Chemical Company; Milwaukee, Wis. unless specified differently.

Materials

Non-Aromatic Multi-(meth)acrylate Monomer With Alkylene Oxide Repeat Units ("A")

SR259 from Sartomer USA (Exton, Pa.) is polyethylene glycol (200) diacrylate.

SR344 from Sartomer USA is polyethylene glycol (400) diacrylate.

SR268 from Sartomer USA is tetraethylene glycol diacrylate.

Polypropylene glycol 400 diacrylate ("PPG400") from Monomer-Polymer & Dajac Labs, PA, USA.

SR9035 from Sartomer USA is ethoxylated (15) trimethylolpropane triacrylate, having a molecular weight per acrylate group of 319 g/mole.

Crosslinking Monomers ("B")

SR351 from Sartomer USA is trimethylolpropane triacrylate (TMPTA), having a molecular weight per acrylate group of 99 g/mole.

SR454 from Sartomer USA is ethoxylated (3) trimethylolpropane triacrylate, having a molecular weight per acrylate group of 143 g/mole.

Monofunctional Diluent ("C")

PBA is 3-phenoxy benzyl acrylate available from Miwon Specialty Chemical Co. Ltd. (Korea) under the trade designation "M1122" having a refractive index of 1.565 and a viscosity of 16 cp at 25° C.

2BEA is 2-phenylphenoxyethyl acrylate available from Miwon Specialty Chemical Co. Ltd. (Korea) under the trade designation "M1142" having a refractive index of 1.575 and a viscosity of about 120 cp at 25° C.

oPPA is 2-phenyl-phenyl acrylate available from Toagosei Co. Ltd. (Japan) under the trade designation "TO-2344" having a refractive index of 1.584 and a viscosity of about 90 cp at 25° C.

Ebecryl 110 (identified as EB110 in tables) is oxyethylated phenol acrylate, also called phenoxyethoxyethyl acrylate, available from Cytec Industries Inc., Americas (GA, USA) having a refractive index of 1.510 and a viscosity of 25 cp at 25° C.

SR339 from Sartomer USA is pheoxy ethyl acrylate (PEA) having a refractive index of 1.517 and a viscosity of 12 cp at 25° C.

Other Materials

| Abbreviation/ product name | Description | Available from |
|---|---|---|
| DCLA-SA | Reaction product of hydroxy-polycaprolactone acrylate and succinic anhydride | Prepared as in Example 1 of US Pat. App. Pub. No. 2011/0227008 |
| HEAS | Reaction product of 2-hydroxy-ethyl acrylate and succinic anhydride | Prepared as in Example 1 of US Pat. App. Pub. No. 2011/0227008 |
| DAROCUR 4265 | 50:50 blend of 2-hydroxy-2-methyl-1-phenyl-1-propanone and 2,4,6-Trimethylbenzoyldiphenyl-phosphine oxide | Ciba Specialty Chemicals, Tarrytown, NY |
| $ZrO_2$ aqueous sol | 41 wt % $ZrO_2$ in water and acetic acid | Described in US Pat. App. Pub. No. 2011/0227008 |

Examples 1-36 and Comparative Examples C1-C3

Polymerizable Resin Compositions 1-36 and C1-C3 were made as described below. The following materials were added to a vessel, in the amounts required to achieve the resin compositions described in the tables below: ZrO2 aqueous sol and an approximately equal weight of 1-methoxy-2-propanol, HEAS diluted 50% in 1-methoxy-2-propanol, DCLA-SA diluted 50% in 1-methoxy-2-propanol, and the acrylates specified in the tables. Water and alcohol were removed via vacuum distillation, then steam was added, followed by further vacuum distillation such that the resultant resin composition was approximately as shown in the tables below. To each resin was added 0.68 wt % of DAROCUR 4265 photoinitiator.

Comparative Example C1 was made as described in Composition 1 of PCT Publication No. WO2012/158317, Composition 1. Such composition is as follows:

| Example | ZrO2 Wt % | HEAS Wt % | DCLA-SA Wt % | SR339 | oPPA | SR601 |
|---|---|---|---|---|---|---|
| C1 | 46.3% | 10.8% | 2.5% | 12.1% | 20.2% | 8.1% |

Comparative Examples C2 and C3 were made as described in US Pat. App. Pub. No. 2009/0017256. C2 is resin R8 and C3 is resin R12.

| Ex. | ZrO$_2$ Wt % | HEAS Wt % | DCLA-SA Wt % | A Wt % | B Wt % | C Wt % | A | B | C |
|---|---|---|---|---|---|---|---|---|---|
| 1 | 49.5% | 12.8% | | 11.3% | 5.7% | 20.7% | SR268 | SR454 | 2BEA |
| 2 | 51.0% | 13.2% | | 10.7% | 5.4% | 19.7% | SR268 | SR351 | PBA |

-continued

| Ex. | ZrO₂ Wt % | HEAS Wt % | DCLA-SA Wt % | A Wt % | B Wt % | C Wt % | A | B | C |
|---|---|---|---|---|---|---|---|---|---|
| 3 | 51.0% | 13.2% | | 10.7% | 5.4% | 19.7% | SR268 | SR454 | PBA |
| 4 | 50.0% | 13.0% | | 11.1% | 11.1% | 14.8% | SR268 | SR454 | PBA |
| 5 | 48.0% | 11.2% | 2.6% | 11.5% | 11.5% | 15.3% | SR268 | SR454 | PBA |
| 6 | 52.0% | 13.5% | | 10.4% | | 24.2% | SR268 | | PBA |
| 7 | 48.0% | 11.2% | 2.6% | 11.5% | 11.5% | 15.3% | SR259 | SR454 | PBA |
| 8 | 48.0% | 11.2% | 2.6% | 5.7% | 17.2% | 15.3% | SR259 | SR454 | PBA |
| 9 | 48.0% | 11.2% | 2.6% | 17.2% | 5.7% | 15.3% | SR259 | SR454 | PBA |
| 10 | 50.0% | 11.7% | 2.7% | 17.8% | 3.6% | 14.3% | SR344 | SR351 | 2BEA |
| 11 | 50.0% | 11.7% | 2.7% | 3.6% | 17.8% | 14.3% | SR344 | SR351 | 2BEA |
| 12 | 48.0% | 11.2% | 2.6% | 11.5% | 11.5% | 15.3% | SR344 | SR351 | 2BEA |
| 13 | 46.0% | 10.7% | 2.5% | 4.1% | 20.4% | 16.3% | SR344 | SR351 | 2BEA |
| 14 | 46.0% | 10.7% | 2.5% | 20.4% | 4.1% | 16.3% | SR344 | SR351 | 2BEA |
| 15 | 48.0% | 11.2% | 2.6% | 11.5% | 11.5% | 15.3% | SR344 | SR351 | PBA |
| 16 | 51.3% | 12.0% | 2.7% | 10.2% | 5.1% | 18.7% | SR344 | SR454 | PBA |
| 17 | 48.0% | 11.2% | 2.6% | 11.5% | 11.5% | 15.3% | SR344 | SR454 | PBA |
| 18 | 50.0% | 11.7% | 2.7% | 17.8% | 17.8% | | SR344 | SR351 | |
| 19 | 46.0% | 10.7% | 2.5% | 20.4% | 20.4% | | SR344 | SR351 | |
| 20 | 46.0% | 7.2% | 9.8% | 37.0% | | | SR344 | | |
| 21 | 46.0% | 6.0% | 12.3% | 35.8% | | | SR9035 | | |
| 22 | 48.0% | 11.2% | 2.6% | 7.6% | 7.6% | 22.9% | SR344 | SR351 | 2BEA |
| 23 | 48.0% | 11.2% | 2.6% | 15.3% | | 22.9% | SR344 | | 2BEA |
| 24 | 48.0% | 11.2% | 2.6% | 15.3% | 3.8% | 19.1% | SR344 | SR454 | 2BEA |
| 25 | 48.0% | 11.2% | 2.6% | 22.9% | | 15.3% | SR344 | | 2BEA |
| 26 | 48.0% | 11.2% | 2.6% | 22.9% | 3.8% | 11.5% | SR344 | SR454 | 2BEA |
| 27 | 50.0% | 11.7% | 2.7% | 7.1% | | 28.5% | SR344 | | PBA |
| 28 | 50.0% | 11.7% | 2.7% | 10.7% | | 25.0% | SR344 | | PBA |
| 29 | 50.0% | 11.7% | 2.7% | 10.7% | 3.6% | 21.4% | SR344 | SR454 | PBA |
| 30 | 50.0% | 11.7% | 2.7% | 14.3% | | 21.4% | SR344 | | PBA |
| 31 | 50.0% | 11.7% | 2.7% | 17.8% | | 17.8% | SR344 | | PBA |
| 32 | 52.0% | 13.5% | | 6.9% | | 20.7%/ 6.9% | SR268 | | PBA/ EB110 |
| 33 | 52.0% | 13.5% | | 34.5% | | | SR268 | | |
| 34 | 60.0% | 15.6% | | 7.3% | | 17.1% | SR268 | | PBA |
| 35 | 20.0% | 5.2% | | 22.4% | | 52.4% | SR268 | | PBA |
| 36 | 48.0% | 11.2% | 2.6% | 7.6% | | 30.6% | PPG400 | | PBA |

Optical Film Sample Preparation

Brightness enhancing films samples were made using the polymerizable resin compositions above. About 3 grams of warm resin was applied to a 51 micron (2 mil) primed PET (polyester) film (available from DuPont, Wilmington, Del., under the trade designation "MELINEX 623"). The backside of this film (opposing surface as the surface the resin was applied) had a matte finish such that the film had a haze of 6%, a clarity of 53% and a transmission of 96%. The liquid resin side of the film was placed against a microreplicated tool with a 90/24 pattern, i.e. a prism apex angle of about 90 degrees and a spacing between prism peaks of about 24 microns. The PET, resin and tool were passed through a heated laminator set at approximately 66° C. (150° F.) to create a uniformly thick sample. The tool containing the film and coated resin sample was passed at 15 m/min (50 fpm) through a Fusion UV processor containing one 236 W/cm (600 W/in) H-bulb and one 236 W/cm (600 W/in) D-bulb. The PET and cured resin were removed from the tool and cut into samples about 8 cm by 13 cm (3 in by 5 in). The prismatic microstructured surface formed on the PET had a thickness of approximately 12 to 13 microns. Brightness enhancing films samples were made using the polymerizable resin compositions of Examples 10-19 and 22-36 in the same way with the exception that the laminator temperature was set at approximately 54° C. (130° F.) and the curing conditions were at 11 m/min (35 fpm) through a Fusion UV processor containing one 236 W/cm (600 W/in) D-bulb. Brightness enhancing films samples were made using the polymerizable resin compositions of Examples 20-21 in the same way with the exception that a 127 micron (5 mil) primed PET, lacking the matte finish, was used as the base substrate.

Ball Drop Test

The test film was placed, prisms up, on a sheet of 0.2 mm PET film, on top of a 3 mm PMMA plate. The test film was covered with a 1.6 mm PC plate laminated with PET with a hard coat from Tekra placed towards the test prisms. The PC plate was covered with a stack of 4 sheets of 0.2 mm PET film. A stainless steel ball bearing, weighing about 53 grams, was dropped through a guide tube from a height of about 30 cm on to the test film stack. The test film was removed, the impacted area was marked, and the film was placed on a lightbox with the prisms away from the light source. A digital photograph was taken of the film in the impacted area at 55° from normal to the film and along the prism direction. The impacted area generally appears brighter than the unimpacted area. ImageJ analysis software (a public domain, Java-based image processing program available from the National Institutes of Health) was used to measure the image brightness on and off the impacted spot.

A higher Ball Drop damage contrast indicates worse damage and that the cured prism composition has lower impact resistance. Most of the results are based on a single measurement. When the test was replicated on the same film sample, an average is reported.

Refractive Index Measurements

The refractive index of each comparative and inventive example resin blend was measured using a Bausch and Lomb Refractometer (CAT No. 33.46.10). The results of the ball drop tests and the refractive index measurements are reported in the table below. The examples show surprisingly low ball drop damage contrast and high refractive index.

| Example | Ball Drop Damage Contrast | Refractive Index |
|---|---|---|
| C1 | 0.36 | 1.624 |
| C2 | 0.30 | 1.547 |
| C3 | 0.14 | 1.531 |
| 1 | 0.11 | 1.611 |
| 2 | 0.05 | 1.612 |
| 3 | 0.05 | 1.612 |
| 4 | 0.03 | 1.600 |
| 5 | 0.02 | 1.594 |
| 6 | 0.07 | 1.625 |
| 7 | 0.01 | 1.593 |
| 8 | 0.02 | 1.593 |
| 9 | 0.01 | 1.593 |
| 10 | 0.03 | 1.599 |
| 11 | 0.02 | 1.603 |
| 12 | 0.02 | 1.598 |
| 13 | 0.02 | 1.592 |
| 14 | 0.02 | 1.589 |
| 15 | 0.00 | 1.595 |
| 16 | 0.01 | 1.613 |
| 17 | 0.00 | 1.594 |
| 18 | 0.01 | 1.575 |
| 19 | 0.00 | 1.562 |
| 20 | 0.03 | 1.562 |
| 21 | 0.03 | 1.562 |
| 22 | 0.05 | 1.611 |
| 23 | 0.01 | 1.609 |
| 24 | 0.01 | 1.599 |
| 25 | 0.01 | 1.594 |
| 26 | 0.00 | 1.588 |
| 27 | 0.00 | 1.624 |
| 28 | 0.00 | 1.618 |
| 29 | 0.00 | 1.611 |
| 30 | 0.00 | 1.611 |
| 31 | 0.00 | 1.606 |
| 32 | 0.06 | 1.623 |
| 33 | 0.00 | 1.579 |
| 34 | 0.00 | 1.651 |
| 35 | 0.00 | 1.560 |
| 36 | 0.00 | 1.613 |

What is claimed is:

1. A brightness enhancing film having a microstructured surface comprising a plurality of prisms, wherein the microstructured surface comprises the reaction product of a polymerizable composition comprising at least 20 wt-% of inorganic nanoparticles having a refractive index of at least 1.68, a non-aromatic multi-(meth)acrylate monomer comprising at least three contiguous alkylene oxide repeat units, and mono(meth)acrylate diluent selected from biphenyl or benzyl monomer.

2. The brightness enhancing film of claim 1 wherein the multi-(meth)acrylate monomer comprises two or three (meth)acrylate groups.

3. The brightness enhancing film of claim 1 wherein the alkylene oxide repeat units have the formula —[O-L]- wherein each L is independently a $C_2$-$C_6$ alkylene.

4. The brightness enhancing film of claim 1 wherein the multi-(meth)acrylate monomer is a di(meth)acrylate comprising at least 5 contiguous alkylene oxide repeat units.

5. The brightness enhancing film of claim 1 wherein the multi-(meth)acrylate monomer is a tri(meth)acrylate comprising a total of at least 10 alkylene oxide repeat units.

6. The brightness enhancing film of claim 1 wherein the multi-(meth)acrylate monomer has the general formula:

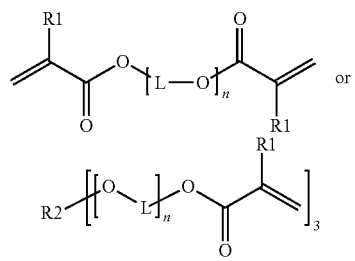

wherein R1 is H or methyl, R2 is a trivalent organic residue, L is independently a $C_2$ to $C_6$ alkylene, and n is 3 to 30.

7. The brightness enhancing film of claim 1 wherein the alkylene oxide repeat units comprise ethylene oxide repeat units, propylene oxide repeat units, or a mixture thereof.

8. The brightness enhancing film of claim 1 wherein the polymerizable composition comprises 3 to 75 wt-% of the multi-(meth)acrylate monomer comprising alkylene oxide repeat units.

9. The brightness enhancing film of claim 1 wherein the polymerizable composition further comprises a crosslinker comprising at least three (meth)acrylate groups.

10. The brightness enhancing film of claim 1 wherein the crosslinker concentration is no greater than about 25 wt-% of the polymerizable composition.

11. The brightness enhancing film of claim 1 wherein the polymerizable composition comprises at least 5 wt-% crosslinker.

12. The brightness enhancing film of claim 1 wherein the polymerizable composition is free of crosslinker.

13. The brightness enhancing film of claim 1 wherein the biphenyl monomer has the general formula:

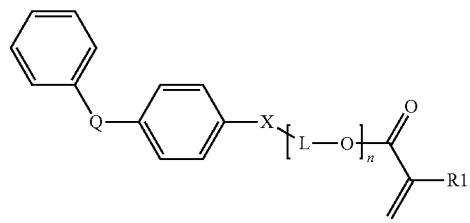

wherein R1 is H or $CH_3$;

X is O or S;

Q is selected from —$(C(CH_3)_2)$—, —$CH_2$—, —$C(O)$—, —$S(O)$—, and —$S(O)_2$—;

n ranges from 0 to 10 (e.g. n is 1, 2, 3, 4, 5, 6, 7, 8, 9, or 10); and

L is an alkylene group having 1 to 5 carbon atoms, optionally substituted with hydroxy.

14. The brightness enhancing film of claim 1 wherein the benzyl monomer has the general formula:

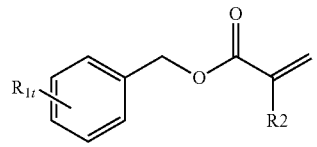

wherein at least one R1 comprises an aromatic substituent, t is an integer from 1 to 4; and R2 is hydrogen or methyl.

15. The brightness enhancing film of claim 1 wherein the amount of inorganic nanoparticles ranges from 40 wt-% to 60 wt-% of the polymerizable composition.

16. The brightness enhancing film of claim 1 wherein the polymerizable resin has a refractive index of at least 1.56.

17. The brightness enhancing film of claim 1 wherein the inorganic nanoparticles comprise zirconia.

18. The brightness enhancing film of claim 1 wherein the inorganic nanoparticles comprise a surface treatment comprising a carboxylic acid end group and at least one $C_3$-$C_{16}$ ester unit.

19. The brightness enhancing film of claim 1 wherein the surface treatment comprises the reaction product of
   i) at least one aliphatic anhydride, and
   ii) at least one hydroxy polycaprolactone (meth)acrylate.

20. The brightness enhancing film of claim 1 wherein the brightness enhancing film has a ball drop damage contrast of no greater than 0.25.

21. The brightness enhancing film of claim 9 wherein the crosslinker has a molecular weight per (meth)acrylate group of no greater than 150 g/mole.

22. The brightness enhancing film of claim 9 wherein the crosslinker comprises trimethylol propane (meth)acrylate, ethoxylated (3) trimethylol propane (meth)acrylate, or a mixture thereof.

23. The brightness enhancing film of claim 9 wherein the mono(meth)acrylate diluent has a refractive index of at least 1.55.

24. The brightness enhancing film of claim 9 wherein the polymerizable composition comprises 10 to 60 wt-% of mono (meth)acrylate diluents(s).

25. The brightness enhancing film of claim 18 wherein the surface treatment has the general formula:

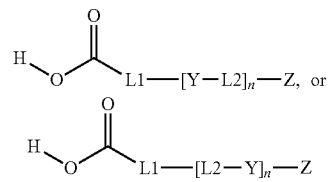

wherein
n averages from 1.1 to 6;
L1 is a $C_1$-$C_8$ alkylene, arylalkylene, or arylene group, optionally substituted with one or more oxygen atoms or an ester group;
L2 is a $C_3$-$C_8$ alkylene, arylalkylene, or arylene group, optionally substituted with one or more oxygen atoms;
Y is

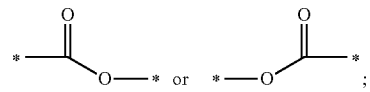

and
Z is an end group comprising a $C_2$-$C_8$ alkyl, ether, ester, alkylene oxide, (meth)acrylate, or combination thereof.

26. The brightness enhancing film of claim 25 wherein Z comprises a (meth)acrylate end group.

* * * * *